May 19, 1964 F. S. PROCTOR ETAL 3,133,848
PROCESS FOR MAKING FLOOR OR WALL COVERING
Filed Sept. 19, 1960 2 Sheets-Sheet 1

INVENTOR.
FRED S. PROCTOR
FRANCIS F. SMARR
BY PAUL W. BRAKELEY, JR.
GEORGE R. MOUNTAIN
ATTORNEY

May 19, 1964 F. S. PROCTOR ETAL 3,133,848
PROCESS FOR MAKING FLOOR OR WALL COVERING
Filed Sept. 19, 1960 2 Sheets-Sheet 2

INVENTORS
BY
FRED S. PROCTOR
FRANCIS. F. SMARR
PAUL W. BRAKELEY, JR.
GEORGE R. MOUNTAIN

ATTORNEY 3,133,848
PROCESS FOR MAKING FLOOR OR
WALL COVERING
Fred S. Proctor, Glen Gardner, Francis F. Smarr and Paul W. Brakeley, Jr., Somerville, and George R. Mountain, Franklin Township, N.J., assignors to Johns-Manville Corporation, New York, N.Y., a corporation of New York
Filed Sept. 19, 1960, Ser. No. 56,834
8 Claims. (Cl. 156—282)

This invention relates to a new process and apparatus for the production of thermoplastic surface covering materials of an improved and novel design, and it is particularly directed to a method and an apparatus for producing floor or wall coverings, counter top coverings, et cetera, in the form of sheets or tiles, and the like, having what may be called a novel "wood-grain" esthetic effect on the surface thereof.

Thermoplastic surface covering materials, such as asphalt and vinyl tiles or sheets are well known. Such materials are ordinarily comprised of a binder, for example, a resin, intermixed with reinforcing fibers, various fillers, plasticizers, and coloring pigments. In general, they are manufactured by heating and mixing the ingredients to produce a thermoplastic mass of base material, milling the mass on a mill to form a relatively thin slab, and calendering the same into sheets. After cooling, the sheets are cut into the desired width and length to form either large sheets or relatively small tiles.

One of the important aspects in the manufacture of such sheets or tiles is the various designs that can be imparted to the wearing surfaces thereof to produce varied esthetic effects. For example, it is well known to produce sheets or tiles having a "marbleized" pattern or a "jaspé" pattern. Since the serviceability and durability of such sheets and tiles have been proven in the last decade, these qualities are taken for granted by the consuming public, and also by the manufacturers of such sheets and tiles, and it is their esthetic effect which is one of the most important factors that must be considered before the manufacture and the marketing of such materials.

An object of this invention therefore is to provide a novel and different design on a sheet or tile of thermoplastic covering material, wherein the sheet or tile surface has a "wood-grain" effect or pattern therein.

An additional object of this invention is to provide a novel process and apparatus for imparting a novel design to sheets or tiles of thermoplastic covering materials.

A further object of this invention is to provide a novel process and apparatus for manufacturing sheets or tiles of thermoplastic covering materials.

Still an additional object of this invention is to provide a tile having a novel basic design embedded in a visible surface thereof.

Other objects and advantages of the invention will become apparent from the description which follows.

In brief, this invention relates to a novel process and apparatus for imparting a novel design to thermoplastic covering materials, wherein, utilizing conventional mill and calender rolls, an agent, the characteristics of which are given more fully hereinafter and which is preferably a fluid, is applied in a controlled manner onto a passing slab of heated thermoplastic material. The temperatures of the various rolls in the calender sections of a line for manufacturing such materials are maintained within certain predetermined ranges; likewise, the temperature of the passing slab is controlled. The slab has resultantly imparted thereto a "wood-grain" design on one of its major surfaces. Subsequent to calendering, the slab is cut into the proper sizes of sheets or tiles to produce the finished marketable floor or wall covering.

The invention will be more fully understood from a consideration of the following, more detailed description thereof, taken in connection with the drawings, in which.

As indicated above, the finished material may be made into sheets of various sizes, e.g., 9" x 9", 12" x 12", or 24" x 24", or into strip tiles of the approximate dimensions of standard, wooden, strip or plank flooring. While the primary applicability of such sheets is in floor coverings, they can also be utilized effectively as side wall coverings and counter tops. It is therefore to be understood that the term "covering" is used herein in its broader sense and includes wall and floor coverings, counter top coverings, and the like.

Figure 1:
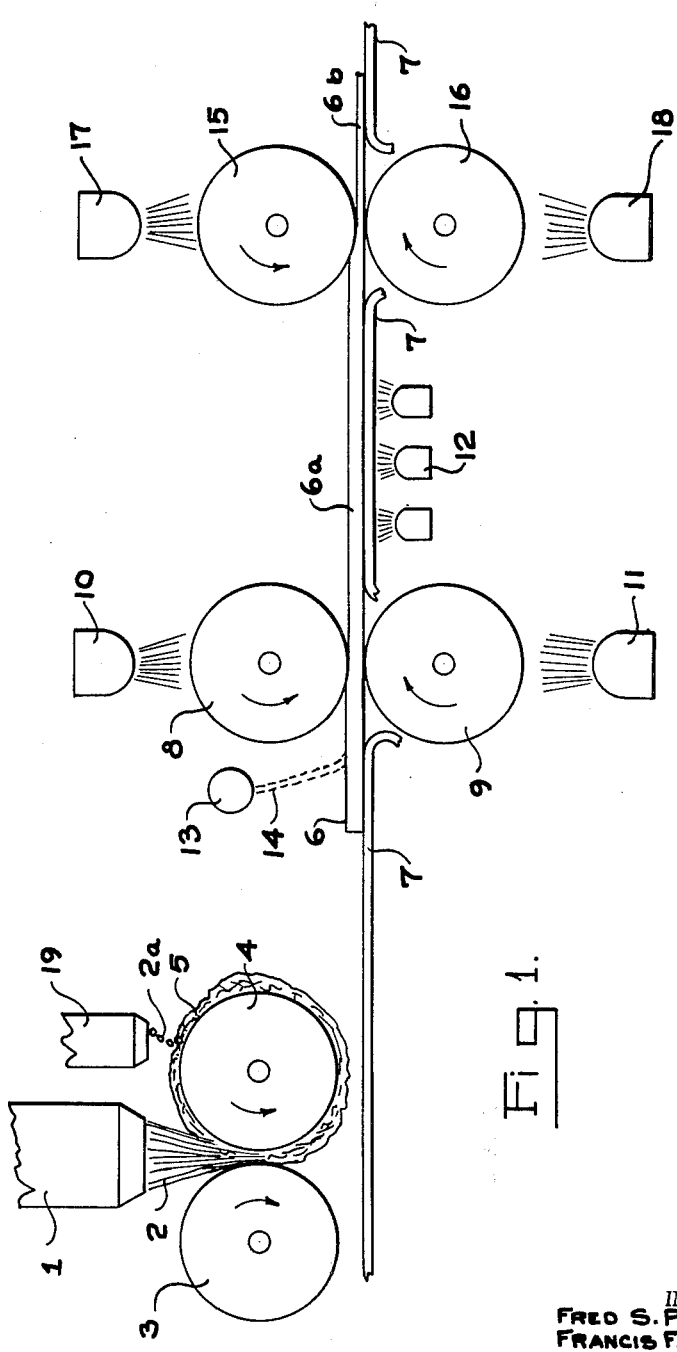
FIG. 1 depicts a diagrammatic representation of the novel apparatus of the instant process.

Referring to FIG. 1, the materials for making the covering are initially dumped into and mixed in a mixer 1, and the mixed materials 2 are deposited between a pair of mill rolls 3, 4. The batch of materials is of the conventional type suitable for use as a surface covering, and it undergoes a mixing and heating cycle which is conventional and well-known. For manufacturing asphalt tile, coal tar resins or styrenated coal tar resins or pitches, usually of a tall oil base, are added to the mixer in conjunction with the proper percentages of reinforcing fibers, usually asbestos fibers, limestone aggregate filler, plasticizing oil, and coloring pigments or dyes. In the event a vinyl tile or a vinyl asbestos tile is being manufactured, a resin, such as for example, polyvinyl chloride acetate copolymer or other vinyl resin, is admixed with stabilizing and primary plasticizers, reinforcing fibers, filler, and a coloring pigment or dye. It is to be understood, however, that the examples of the various materials combined to form a mixture are by way of illustration only and should not be considered as limitations to the instant invention as many other thermoplastic mixtures, of the type suitable for floor and wall coverings, may be used according to the principles and tenets of the present invention. The mill rolls 3, 4 are heated in a manner to cause the material being milled to adhere to one of the rolls only; this is effected usually by having the roll 4 at a surface temperature much less than the surface temperature of roll 3. Roll 4 to which the material adheres, is considered to be the cold roll, even though it is also heated, and roll 3 is considered to be the hot roll.

During milling of the thermoplastic mixture into a slab splash 2a is deposited on the mixture being milled, as from a container 19. The added splash is of chip or particle form and is composed of the same material as the basic mix, which has been previously formed into a covering sheet and subsequently decimated or ground into chips or particles; however, the splash particles are preferably of a color or colors different from that of the basic mix. Usually, the splash particles are multi-colored, while the base mixture is of a single color. In order to obtain a more accurate control on the ultimate esthetic effect produced, the particles may be graded according to size by establishing a grading procedure utilizing standard mesh screens.

After a proper milling time of the original mixture and the added splash, the formed slab of material is removed from the cold roll 4 by a doctor blade, folded upon itself, turned 90°, i.e., turned transversely to the longitudinal directional pattern produced in the sheet during milling, and deposited as a continuous slab or sheet 6 upon one flight of a conveyor 7 having a plurality of longitudinally spaced flights. The slab's upper surface is ordinarily of a solid color having a plurality of randomly positioned splash particles, of a different tone or color as compared to the base, with the particles being softened somewhat by the heat of milling and extended very slightly by the compression of milling.

The conveyed slab 6 has thereafter superimposed thereupon an agent or medium, preferably a fluid in the form of a heat transfer liquid, in an irregular or non-uniform pattern or a regular pattern, but, in either case, so as to leave a substantial portion of the surface of the passing slab 6a not reached by the agent, that is to say, a substantial portion of the passing surface is left hot and dry. The agent is supplied from a container 13 and is deposited, preferably, in the form of droplets or a spray 14. Nozzles may be utilized which supply a number of laterally spaced rows of droplets; the nozzles may be mounted, if so desired, on some form of oscillating structure so as to deposit the agent in an irregular pattern. In one form of the invention, water was used as the agent; however, numerous substitutes are available. For example, steam, soapy water, morpholine emulsions, a wax-water emulsion, plasticizer and water mixtures, silicone greases, ammonia and various types of organic solvents (hexane, alcohol, for example), and mixtures thereof, may be utilized as the agent. In the selection of an agent, consideration must be given as to whether any contamination to the passing sheet or to any of the calender or mill rolls occurs. Water in its fluid state, preferably in liquid form, or water solutions are almost ideal in this respect as they do not mar the sheet in any way and, at the same time, they leave the calender rolls fully polished at all times.

The application of the agent in the manner described is a direct application of the agent to the surface of the passing slab. However, the agent may also be applied to the slab surface indirectly. Thus, it may be applied to the outer surface of calender roll 8, which during rotation thereof places the added agent against the surface of the slab during calendering.

In addition, various types of mechanical apparatus may be utilized to assist in depositing the agent either on the passing sheet or on the appropriate calender roll. For example, a cloth may be suspended over the passing slab so that it is transverse and vertical thereto. The agent, if in fluid form, may then be sprayed onto the cloth, rather than directly onto the sheet. The cloth, after becoming saturated, drips the excess fluid to the subjacent passing sheet. The cloth, in a sense, acts as an accumulator compensating for small pressure fluctuations present during feed of the agent. As used herein, application of the agent to the surface of the slab includes application by the direct method, i.e., directly to the passing surface of material, and by the indirect method, i.e., by first applying the agent to one of the calender rolls or to some intermediate apparatus which provides for the deposit of the agent on the calender roll or on the slab.

After the agent has been applied to the slab, the latter is passed through a first calender section, consisting of a pair of opposing calender rolls 8, 9, wherein the desired "wood-grain" pattern is for the most part imparted to the upper surface of the material. This calender section is considered to be the "pattern-forming" calender section, since the greatest amount of material extrusion occurs at this first section as compared to the amount of extrusion at subsequent calender sections; as a result of the extrusion, the primary aspects of any pattern are initially imparted to the sheet.

The upper roll in the calender section is considered to be the "hot" roll and the lower roll is termed the "cold" roll. The temperature of the outer surface of the upper roll is maintained between approximately 175°–275° F., and the hot roll imparts a high gloss to the upper surface of the slab. The lower roll has its outer surface maintained at a temperature between 90°–120° F. The temperature of the lower roll 9 relative to the temperature of the upper roll 8 is one of the controlling factors in imparting the particular pattern produced. A temperature differential of at least 80° F. should be maintained to produce the design effect or pattern desired. The temperature of the lower roll is also varied according to the hardness of the base material comprising the slab 6, the harder the base, the higher the temperature necessary to maintain a particular pattern. The temperatures of the surfaces of the upper and lower rolls 8, 9 are controlled by the use of heaters 10, 11 situated adjacent the upper and lower rolls, respectively. These and subsequent heaters are representative of any conventional heating systems, as, for example, steam applied internally of the calenders, heat applied at the ends of the rolls etc.

The slab 6a, resulting from the passage of the initial slab 6 through the first calender section, is preferably reduced in thickness to less than 100 mils, usually in the range of approximately 70 mils for 1/16" sheets (for 1/8" sheets, the slab 6a would have a thickness of approximately 130–140 mils), and has imparted thereto a design of a plurality of elongated streaks, which are elongated splash particles, embedded in the matrix, which is ordinarily of a solid color. Certain streaks are randomly deflected transversely for a short distance or are of marked wavy form; others have marked swirls therein; and still others merely have an elongated pattern without any appreciable deflection thereto. The curved effect is imparted to those streaks, or, more particularly, random areas of random streaks, having the agent superimposed thereover before calendering. The basic "wood-grain" pattern is formed by such initial calendering; however, the wavy pattern is ordinarily slightly greater or more extreme than that desired in the finished product.

A plurality of heaters 12 located adjacent the conveyor 7 heat and raise the temperature of the slab 6a passing thereby. The milled and initially calendered material has its temperature increased to approximately 230°–240° F. The temperature and the degree of heat imparted to the slab vary slightly with the consistency and hardness of the passing slab of material 6a. The heating of the slab 6a removes any rippling effect appearing in the upper slab surface, intended later to be the wearing surface of the finished tiles. Reheat of the passing slab does not affect the pattern, but merely assists in producing a tile having surface characteristics according to accepted manufacturing standards.

The reheated slab is passed through a second pair of opposed calender rolls 15, 16, which are heated by conventional heaters 17, 18, respectively. Heater 18 maintains the surface temperature of the lower roll 16 at approximately 100°–130° F., and heater 17 maintains the surface temperature of the upper calender roll 15 at approximately 160°–170° F. Similarly, with this set of opposed calender rolls, the lower is termed the cold calender while the upper is the hot calender roll. The temperature of the bottom roll is increased slightly, as compared to conventional practices, to prevent the creation of "chill" marks (i.e., small cracks) in the upper surface of the passing slab, while the temperature of the upper roll is maintained relatively high to cause adherence of the slab thereto. The resultant slab 6b is further reduced in thickness, as compared to the thickness of slabs 6a and 6, and has the desired finished "wood-grain" effect imparted to the upper surface of the material. The basic surface pattern, created by the pattern forming or first calender section, is altered, due to additional slight elongation of the material, in that the waviness of the streaks is somewhat less marked, resembling more closely an actual "wood-grain" pattern. In addition, the streaking of the splash particles is made finer. The slab 6b is thereafter cooled at a controlled rate with either cool air or water sprays, and it passes through a cutter section (not shown), which reduces the finished slab into tiles or other sheets.

The present embodiment discloses a pair of calender sections; however, more sections are often used; the effect of which, on the sheet, is cumulative. It is to be understood that the instant process is capable of being used regardless of the number of calender sections. However, where more than a pair of calender sections are utilized in a manufacturing line, the temperatures of the rolls and the spacings therebetween can be modified to some degree, but the results obtained by following the basic precepts of this invention will be the same as those presently disclosed.

In addition, each calender section is described as comprising a pair of opposed rolls. However, different types of calender sections are also prevalent in the tile manufacturing industry. In lieu of a pair of rolls, three or four roll calender sections are in common use. Consequently, the use of the phrase "calender section" is intended not only to include a section having a single pair of opposed rolls, but also a plurality of rolls, in excess of two, operatively related to each other to effect a calendering operation.

In the embodiment of the invention described, the agent was applied either in droplet form or as a fluid spray to effect fluid accumulation. In such applications, the agent should be applied in an irregular pattern, or, if in a regular pattern, in some form of spaced arrangement. The exact effect of the application of the agent, either directly or indirectly, to the surface of the passing slab is not known precisely, as the action between the slab, agent, and the calender rolls cannot be examined closely and cannot be logically analyzed very readily. It is theorized that a certain chilling effect is produced, which may result in a slight difference in passage rate of random surface areas of the slab through the calender section, as compared to the passage rate of the main body of the matrix of which the slab is comprised. With most aqueous solutions, and with many other liquids, some form of thermal differential action is apparently effected not only on the outer surface of the calender roll but also on the surface of the thermoplastic slab. Since the temperature of the passing slab is quite high, a thermal differential plasticity may result in the upper surface of the slab, in the sense that the plasticity of an area having the agent thereupon, especially a surface area having a splash particle therein, is markedly different from the plasticity of adjacent areas not reached by the agent. Since the passage of the slab through the first calender section is basically an extrusion operation, the more plastic areas will have a tendency to be drawn through faster than the less plastic areas. However, in addition to being drawn through faster linearly, the more plastic areas also tend to flow laterally around the less plastic areas, producing the swirls evidenced in the tile. In a sense, therefore, the agent apparently acts as a heat transfer agent and is a thermal differential producing agent or an agent which causes a thermal differential plasticity.

Figure 3:
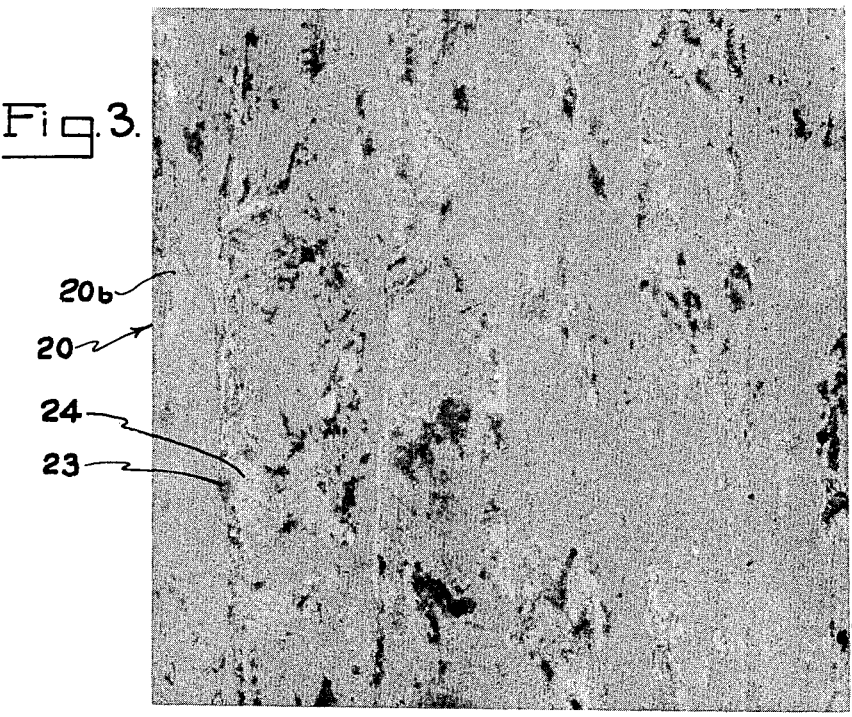
FIG. 3 is a view in elevation of the back side of a floor tile manufactured according to the precepts of the instant invention.

Another theory advanced is that the added agent, as, for example, water, acts as a viscosity modifier. The temperature of the surface of the slab is approximately 235° F. and the temperature of the splash particles is considerably less; the temperature of the surface of the upper roll is in the range of 175°–275° F.; the temperature of water at room temperature is approximately 70°–90° F.; and the temperature of the lower roll is approximately 90°–120° F. These various temperatures all play a part to produce the final result. According to the latter theory, the upper surface of the slab encountering the hot upper roll is drawn out and extruded. However, since water particles are also extruded, small islands of moisture covered or embedded material are created, with these islands having an appreciably greater viscosity than the material therearound. As a result, the surrounding material, having the lesser viscosity, tends to flow around such islands. When this effect is produced at a splash particle, a swirl or "knot effect" is created. The bottom surface, not having water thereupon and encountering the cold roll, is not affected in such a way, and the bottom surface undergoes a straight linear extrusion. As seen in FIG. 3, the splash particles 23, 24 adjacent the bottom surface are deformed into the form of blotches and do not even give the bottom surface a directional characteristic. Thus, under this theory, the added agent acts as material mobility modifier or as a local demobilizing agent, in the sense that the mobility of small areas is drastically affected by the addition of the agent and the action of the upper roll thereupon.

Moreover, it is also believed that some lubricating effect must also take place. It is known that water, under certain circumstances, acts as a lubricator. In the instant case, it is quite possible that small particles of water, for example, when drawn through the rolls produce a localized lubrication. Where such lubrication occurs at or adjacent a splash particle, such lubrication might assist in effecting the knot or swirl effect evidenced on a surface of the finished sheet.

Figure 2:
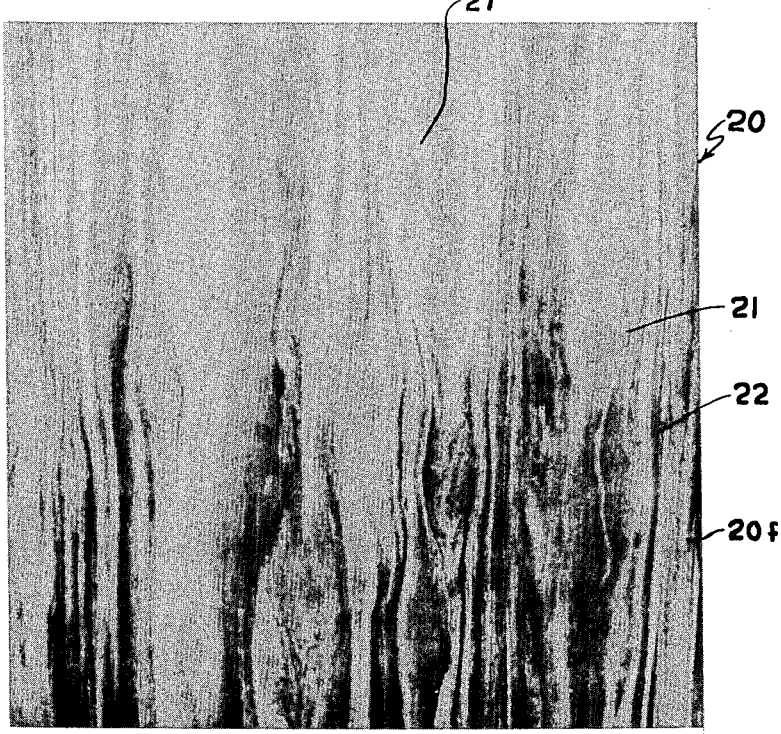
FIG. 2 is a view in elevation of the front surface of a floor tile, manufactured according to the precepts of the present invention, depicting the "wood-grain" effect produced thereupon.

Referring to FIG. 2, the resultant sheet 20 has upon one of its major surfaces 20f streaks or veining 22 of the added colored splash in the basic mix, produced by the milling and the calendering of the slabs and the splash into the slabs, giving the sheet a marked directional characteristic. Interspersed on the surface 20f of the sheet are a plurality of swirls and wavy areas 21 which closely resemble the knot effect found in natural wood. The surface areas 21 vary in size, location, and in color tone, as compared to the color of the basic matrix, to produce an effect similar to that found in knotty wood. These areas are believed to conform approximately to those areas having deposited thereupon a smattering of water, of other agent, and which resulted from the action of the calender rolls 8, 9 thereupon.

On the reverse side 20b of the sheet 20, numerous light and dark spots or blotches, 24 and 23, respectively, are visible thereupon. These are splash particles embedded in the matrix of the sheet, which have not undergone the finishing operation of the splash particles on the opposite side. Surprisingly, a blotch or spot occurs directly opposite a marked swirl or "knot" effect on the front face.

In describing the esthetic effect produced on a surface of a sheet of thermoplastic material as a "wood-grain" effect or design, it is not intended to limit such designs to knotty wood, the basic coloring must be light brown or knotty wood, the basic coloring might be light brown or tan, or some color similar thereto, while the splash must be somewhat similar in color, but usually darker, so that a dark tone effect is produced at the wavy areas. In a matrix that is light in tone, the knot effect is not only simulated but also accentuated. However, if markedly different colors are used for the basic mix, as, for example, green, gray, red, turquoise, etc., and the sheet is manufactured by the process and apparatus of the present invention, a basically similar esthetic effect is produced. In a sense, the resultant sheet does not resemble wood, because of the sharp difference in coloring of the sheet as compared to the group of basic colors normally associated with wood, whether natural or stained. Since the basic esthetic results imparted to the sheet, however, are the same regardless of the coloring of the basic mix and added splash, the effect, for the purposes of this invention, is referred to as a "wood-grain" effect.

In an illustrative example of the process described, a basic mixture can be dumped into a mixer 1 of the Baker-Perkins type and heated and mixed therein. The mix may have the following ingredients approximately by weight:

| Ingredient | Percent |
|---|---|
| Polyvinyl resin (mixture of the copolymers of approximately 15% vinyl acetate and 85% vinyl chloride) | 18 |
| Stabilizing plasticizer (epoxidized soybean oil) | 3 |
| Primary plasticizer (phthalate ester plasticizer; mixture of butyl-benzyl phthalate and butyl-octal phthalate) | 5 |
| Asbestos fiber (grade 7R, Quebec Asbestos Mining Association) | 30 |
| Filler (limestone) | 40 |
| Coloring pigment or dye (red oxide) | 4 |

After a proper length of mixing time (approximately 12 minutes), the resultant mass 2 is deposited upon a pair of mill rolls 3, 4 and milled therebetween for approximately 1½ minutes. Splash particles are then added to the mixture during continued milling for approximately 1½ minutes. The formed milled slab is doctored off the cold roll 4, folded, turned 90° to the direction of sheet travel in the mill, and deposited upon the conveyor 7 as the slab 6, which is then passed by the agent application area and between the pair of calender rolls 8, 9.

Water at room temperature may be used as the agent and is sparsely deposited, in an amount sufficient only to result in the esthetic effect desired; this amount can be adjusted periodically by observation of the ultimate designs produced. The lower roll of the calender has its surface temperature at approximately 95° F., and the upper roll has its surface temperature at approximately 275° F. The calendered slab 6a is thereafter heated by a series of gas heaters 12 installed in front of the calender rolls 15, 16 (considering the output end as the front of the machine). The trickness of the slab 6a is maintained at approximately 70 mils (0.070"). Calender rolls 15, 16 are heated to a temperature of 165° F. and 125° F. respectively, and the slab 6a is calendered therebetween to result in the final sheet 6b having the desired thickness and surface pattern thereupon. The latter slab is thereafter cooled and cut into small tiles, resulting in the tile evidenced by FIGS. 2 and 3.

In an additional embodiment of the process of the instant invention, the basic apparatus, per se, was the same as illustrated in FIG. 1. Instead of adding the agent in spray or droplet form from the supply 13, a fluid agent was applied as a fog or a very fine mist either directly to the surface of the sheet 6, or indirectly thereto by first fogging it to the calender roll 8 or by fogging the agent to a vertically transverse cloth, as noted. With this form of application, it is not necessary that the agent be applied in some type of irregular pattern or spaced regular pattern. Surprisingly, the fog could be applied across the entire width of the surface of the passing slab or across the entire width of the rotating calender 8. During application of the fog to the calender 8, for example, small beads of agent are evidenced thereupon. At the nip between the upper calender 8 and the passing surface of the slab, a small bead, approximately ⅛" thick, occurs at the nip continuously across the full length of the roll. A steady state condition is created, wherein the added foggy agent compensates for the loss of agent from the nip, and the bead at the nip thereafter neither appreciably increases nor decreases in size.

With this form of agent application control, the temperatures of the calenders may be operated in the lower portion of the range of roll temperatures noted. Calender 8 may be in the range of surface temperature between approximately 175°–275° F., preferably between approximately 175°–190° F., and its opposed calender may have its surface temperature maintained between approximately 90°–120° F., with a temperature differential of at least approximately 80° F. being maintained. The second calender section had its upper roll at a surface temperature of 160°–170° F., and the lower roll surface temperature at 100°–130° F. The action of the various rolls upon the sheet was the same as that described with the previous embodiment of the instant process.

With this form of agent application, the effective action of the secondary heaters 12 became redundant. The purpose of such heaters was to eliminate any tendency of the passing slab or sheet to ripple. However, in the instant embodiment of the process, the rippling tendency was not discovered, in the sense that sheets conforming to commercially accepted standards could be produced without the use of heaters 12.

The surprising fact in the latter embodiment of the process is that sheets are produced which are very similar and of the same basic type as the sheets of the previous embodiment of the process. It is believed that with light agent application, in the manner described, the described effects or actions are still somehow produced. The theories previously recited can be similarly advanced as to the effect of the agent, taking into consideration the various temperatures, type of material, etc., as explained with regard to the former embodiment of the process. One might expect, however, that if the bead were maintained at the nip, the effect of the agent on the sheet would be constant so that a consistent uniform pattern would be produced. Such is not the case. Referring to FIG. 2, the resultant tile is basically the same as illustrated and previously described.

In an example of the latter embodiment of the process, a basic mixture is dumped into the mixer 1 and heated and mixed therein. The mix has the same ingredients and at least approximately in the same percentages as recited in the prior example described.

After a proper length of heating and mixing time, the resultant mass 2 is deposited upon the pair of mill rolls 3, 4 and milled therebetween for a short period. Splash particles are then added in a random manner to the mixture being milled. Total milling time may be approximately three minutes. The formed milled slab is doctored off the cold roll 4, folded upon itself, turned 90°, and deposited upon the conveyor 7 as the slab 6. The latter then enters the first calender section, passing between calenders 8 and 9 heated by heaters 10 and 11. The surface temperatures of the upper and lower rolls are maintained at 185° F. and 95° F., respectively.

Water is applied behind the calender 8 in a foggy mist sufficient to create a relatively small continuous bead of water extending across the full width of the slab at the nip between the upper calender 8 and the upper surface of the passing slab.

The calendered slab is recalendered at the second calender section, passing between calenders 15 and 16 heated by heaters 17, 18. The surface temperatures of the upper and lower rolls are maintained at 165° F. and 125° F., respectively. No additional heat is applied to the sheet between the two calender sections.

The resultant sheets, after being cooled, waxed, and trimmed, have the appearance of the sheets shown in FIG. 2.

There has been disclosed a specific formulation for a vinyl asbestos sheet, suitable for use as a floor tile, which can be manufactured under the precepts of this invention. It is to be understood that other formulations for vinyl asbestos sheets may be used, and with which the process and apparatus of the present invention can be used to produce the sheets of this invention. Moreover, there are numerous other formulations for the manufacture of vinyl or asphalt sheets, which may be used to manufacture the sheets of the present invention. Additional specific examples of such formulations are believed not to be necessary, as such formulations are well known by the manufacturers of covering materials. The example is given for purposes of illustration and should not be construed as a limitation upon the present invention.

In explaining the action of the fluid agent upon the slab and calender rolls, various theories have been proposed. As noted, the particular action of the various elements and ingredients are very difficult of analysis. Consequently, the various theories are proposed for the purpose of clarification, and not as limitations upon the invention, especially if such theories are subsequently discovered to be in error. The invention has been fully disclosed both as to a specific example and as to the general field of application. Consequently, a working of this invention is no way dependent upon a full and exact understanding of all the theoretical principles which may be involved.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. In the process of forming a grained design in a thermoplastic sheet for use typically as a floor tile, comprising the steps of:
   (a) forming a heated plastic sheet of thermoplastic material;
   (b) the material including therein thermoplastic splash particles of a cooler temperature than the thermoplastic sheet material; and
   (c) calendering the sheet with splash particles therein between opposed rolls having different temperatures;
   the improvement comprising the steps of:
   (d) applying to the surface of the sheet to be engaged by the hotter calender roll a noncontaminating substance which cools, and increases the viscosity of, the heated sheet surface; and
   (e) maintaining the temperature differential between the calender rolls at about 80° F. or greater,
   whereby, the splash particles will be streaked, and swirl marks simulating wood-grain knots will be randomly disposed on the surface of the sheet engaged by the hotter calender roll.

2. The process of forming a grained design in a thermoplastic sheet as recited in claim 1, wherein the hotter calender roll is maintained at a temperature in the approximate range of 175° F.–275° F., and the cooler calender roll is maintained at a temperature in the approximate range of 90° F.–120° F., while maintaining the temperature differential between the rolls at about 80° F. or greater.

3. The process of forming a grained design in a thermoplastic sheet as recited in claim 1, including the additional step of calendering the sheet with the wood-grain design therein between a second set of opposed rolls spaced from the first set of opposed rolls.

4. The process of forming a grained design in a thermoplastic sheet as recited in claim 3, including the additional step of heating the sheet between the first and second calendering operations.

5. The process of forming a grained design in a thermoplastic sheet as recited in claim 1, wherein the noncontaminating substance is applied only to portions of the sheet.

6. The process of forming a grained design in a thermoplastic sheet as recited in claim 1, wherein the noncontaminating substance is a liquid applied as a mist in such volume as to create a steady bead of liquid at the nip of the calender rolls.

7. The process of forming a grained design in a thermoplastic sheet as recited in claim 2, wherein the noncontaminating substance is water.

8. The process of forming a grained design in a thermoplastic sheet as recited in claim 2, wherein the thermoplastic sheet is comprised of a vinyl-asbestos composition.

References Cited in the file of this patent

UNITED STATES PATENTS

| | | |
|---|---|---|
| 2,091,361 | Heppes | Aug. 31, 1937 |
| 2,624,068 | Dobry | Jan. 6, 1953 |
| 2,914,807 | Robbins | Dec. 1, 1959 |